(12) United States Patent
Itokawa

(10) Patent No.: US 6,477,317 B1
(45) Date of Patent: *Nov. 5, 2002

(54) VIDEO REPRODUCING APPARATUS WHICH DEMULTIPLEXES A PLURALITY OF VIDEO PROGRAMS AND OUTPUTS A PLURALITY OF PROGRAM NUMBERS (ATTRIBUTE DATA) IN PARALLEL

(75) Inventor: Osamu Itokawa, Akishima (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/947,326

(22) Filed: Oct. 8, 1997

Related U.S. Application Data

(63) Continuation of application No. 08/556,698, filed on Nov. 13, 1995, now abandoned.

(30) Foreign Application Priority Data

Nov. 14, 1994 (JP) .............................................. 6-278905

(51) Int. Cl.⁷ ................................................. H04N 5/91
(52) U.S. Cl. .......................... 386/95; 386/109; 370/535
(58) Field of Search ...................... 360/33.1; 370/110.1, 370/477, 535; 348/474; 386/15, 33, 36, 37, 40, 65, 83, 85, 92, 95, 98, 109, 123, 124, 125

(56) References Cited

U.S. PATENT DOCUMENTS

| | | | | |
|---|---|---|---|---|
| 4,974,064 A | * | 11/1990 | Tsinberg | 358/12 |
| 5,377,051 A | * | 12/1994 | Lane et al. | 360/33.1 |
| 5,420,866 A | * | 5/1995 | Wasilewski | 370/110.1 |
| 5,485,221 A | * | 1/1996 | Banker et al. | 348/563 |
| 5,485,279 A | * | 1/1996 | Yonemitsu et al. | 348/411 |

FOREIGN PATENT DOCUMENTS

EP  0 618 724  10/1994

OTHER PUBLICATIONS

The MPEG–2 Standard part 1, sections 0–2.1, Nov. 1993.*
The Grand Alliance HDTV System Specification version 1.0, Apr. 14, 1994.*
People's Republic of China Patent Office, First Office Action dated Nov. 30, 2001.

* cited by examiner

Primary Examiner—David Vincent
(74) Attorney, Agent, or Firm—Fitzpatrick, Cella, Harper & Scinto

(57) ABSTRACT

A data reproducing apparatus for recording/reproducing a multiplexed bit stream has a detection circuit for detecting information regarding attribute of data from the bit stream during reproduction and an output unit for outputting the detected information regarding the attribute of data and the bit stream.

18 Claims, 6 Drawing Sheets

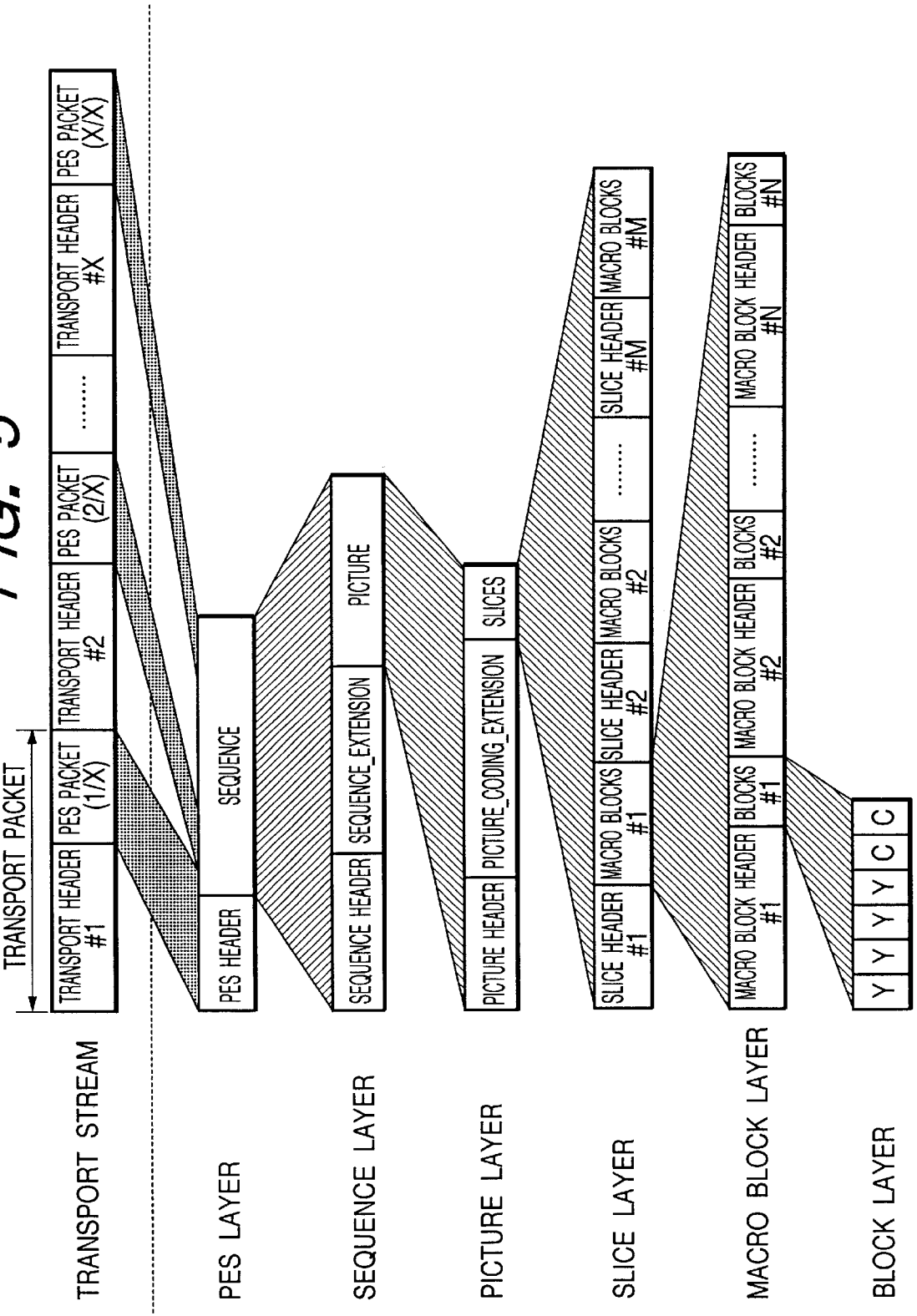

VIDEO REPRODUCING APPARATUS WHICH DEMULTIPLEXES A PLURALITY OF VIDEO PROGRAMS AND OUTPUTS A PLURALITY OF PROGRAM NUMBERS (ATTRIBUTE DATA) IN PARALLEL

This application is a continuation of application Ser. No. 08/556,698 filed Nov. 13, 1995, now abandoned.

BACKGROUND OF THE INVENTION

1. Field of the Invention

The present invention relates to a data reproducing apparatus for recording/reproducing a digital signal such as digital broadcast data.

2. Related Background Art

With the advent of digital images and voices, rules of digital transmission are under progress even in broadcast systems. As current specifications of digital moving images, CCITT (presently ITU-T) has proposed H.261 for picture phones and TV conferences and MPEG (Moving Picture Experts Group) for CD-ROMs, and ISO/IEX and ITU-T have proposed MPEG2 for high definition transmission inclusive of HDTV. The ATV (Advanced Television) system for the next generation TV system studied in U.S.A. has been determined as a subset of MPEG2. In the ATV system, audio and video data is transmitted in the form of a transport stream as a payload of the transport packet of 188 bytes. The transport stream is constituted by continuous transport packets, and the start field of each packet is added with header information called a transport header. It is possible to identify from this header information whether data in the packet is video, audio, channel, program number, or other attribute data.

In decoding an ATV signal, a decoder unit receives (i) a transport stream on a channel selected by a user and (ii) a control signal including the selected channel and program number, and then decodes the transport stream in accordance with the control signal and outputs audio and video signals.

If a user wants to see and hear an ATV broadcast in real time, the user's setting is reflected by the control signal supplied to the decoder unit. However, if a signal reproduced by a VTR is to be decoded, the VTR supplies only the bit stream to the decoder unit and does not supply the control signal including a program number. If the bit stream has only one program number, the decoder unit may detect it. However, if another program starts after one program is completed, images may be disturbed at the transition period between programs. The decoder unit is therefore required to always monitor program numbers. In addition, if a plurality of program numbers are recorded in a bit stream, selection means for selecting a program number becomes necessary.

SUMMARY OF THE INVENTION

The invention has been made in order to solve the above problems. It is an object of the present invention to provide a data reproducing apparatus capable of supplying a bit stream and a control signal including attributes of data such as a program number when a signal from a VTR is decoded.

It is another object of the present invention to provide a data reproducing apparatus capable of determining a priority order of a plurality of program numbers recorded in a bit stream to be sent to a decoder unit.

In an embodiment of the invention, a data reproducing apparatus for recording/reproducing a multiplexed bit stream, comprises detection means for detecting information regarding attribute data from the bit stream during reproduction and output means for outputting the detected information regarding the attribute data and the bit stream.

In another embodiment of the invention, the detection means of the data reproducing apparatus has selective output means for selecting and outputting one of a plurality set of information regarding the attribute data.

In the embodiment, information regarding the attribute data such as a program number is detected from the reproduced bit stream and outputted together with the bit stream. Accordingly, the bit stream can be decoded by using the information regarding the attribute data so that a correct reproduced signal can be always obtained even if there is a transition period between programs.

In the other embodiment, even if there is a plurality set information regarding the attribute of data, a correct reproduced signal can be always obtained.

Other objects and advantages of the invention will become apparent when read in conjunction with the accompanying drawings.

BRIEF DESCRIPTION OF THE DRAWINGS

FIG. 5 is a diagram showing the format of video data.

DETAILED DESCRIPTION OF THE PREFERRED EMBODIMENTS

Figure 1:
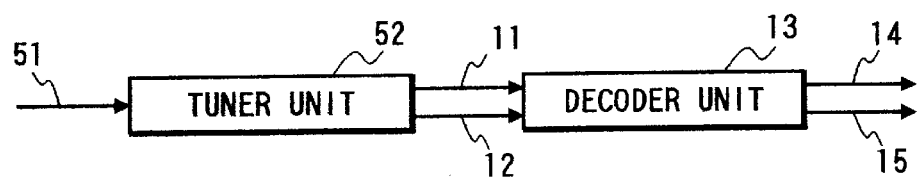
FIG. 1 is a block diagram showing the structure of a decoder for an ATV broadcast signal.

A flow of decoding an ATV signal pertaining to the invention will be briefly described. FIG. 1 is a block diagram of a decoder for decoding an ATV signal. The channel of an ATV broadcast signal 51 is selected by a user from a tuner unit 52. A transport stream 11 of the selected channel and a control signal 12 including the selected channel and program number are supplied to a decoder unit 13. The decoder unit 13 decodes the transport stream 11 in accordance with the control signal 12 and outputs a video signal 14 and an audio signal 15.

Figure 2:
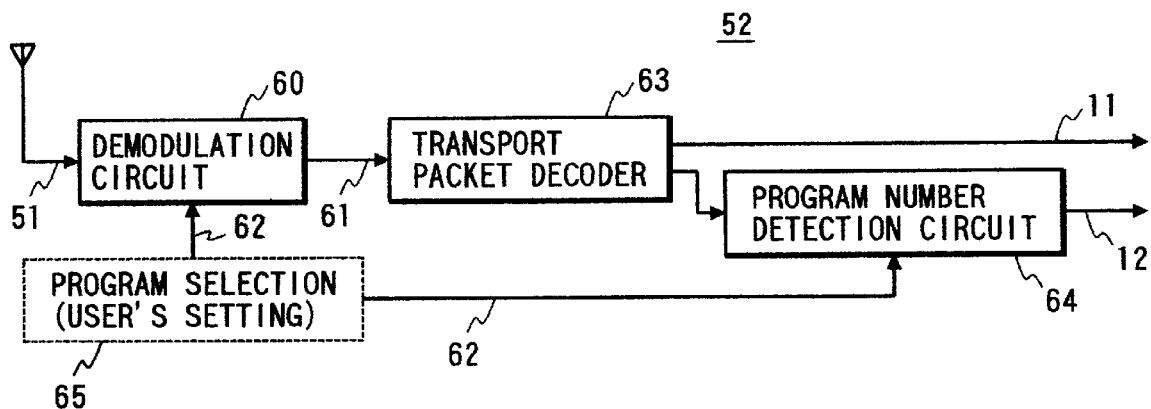
FIG. 2 is a block diagram showing the structure of a tuner unit shown in FIG. 1.

FIG. 2 is a block diagram showing the details of the tuner unit 52 shown in FIG. 1. The ATV broadcast signal 51 has either one program per one channel or a plurality of multiplexed programs per one channel. The channel and program number selected by a user from a program selection unit 65 are supplied as a control signal 62 to a demodulation circuit 60 and to a program number detection circuit 64. The demodulation circuit 60 selects the channel and outputs a signal 61 representative of the channel. A transport packet decoder 63 outputs a transport stream 11 of the program of the selected channel. The program number detection circuit 64 detects the program number from the transport stream 11 outputted from the transport packet decoder 63.

Figure 3:
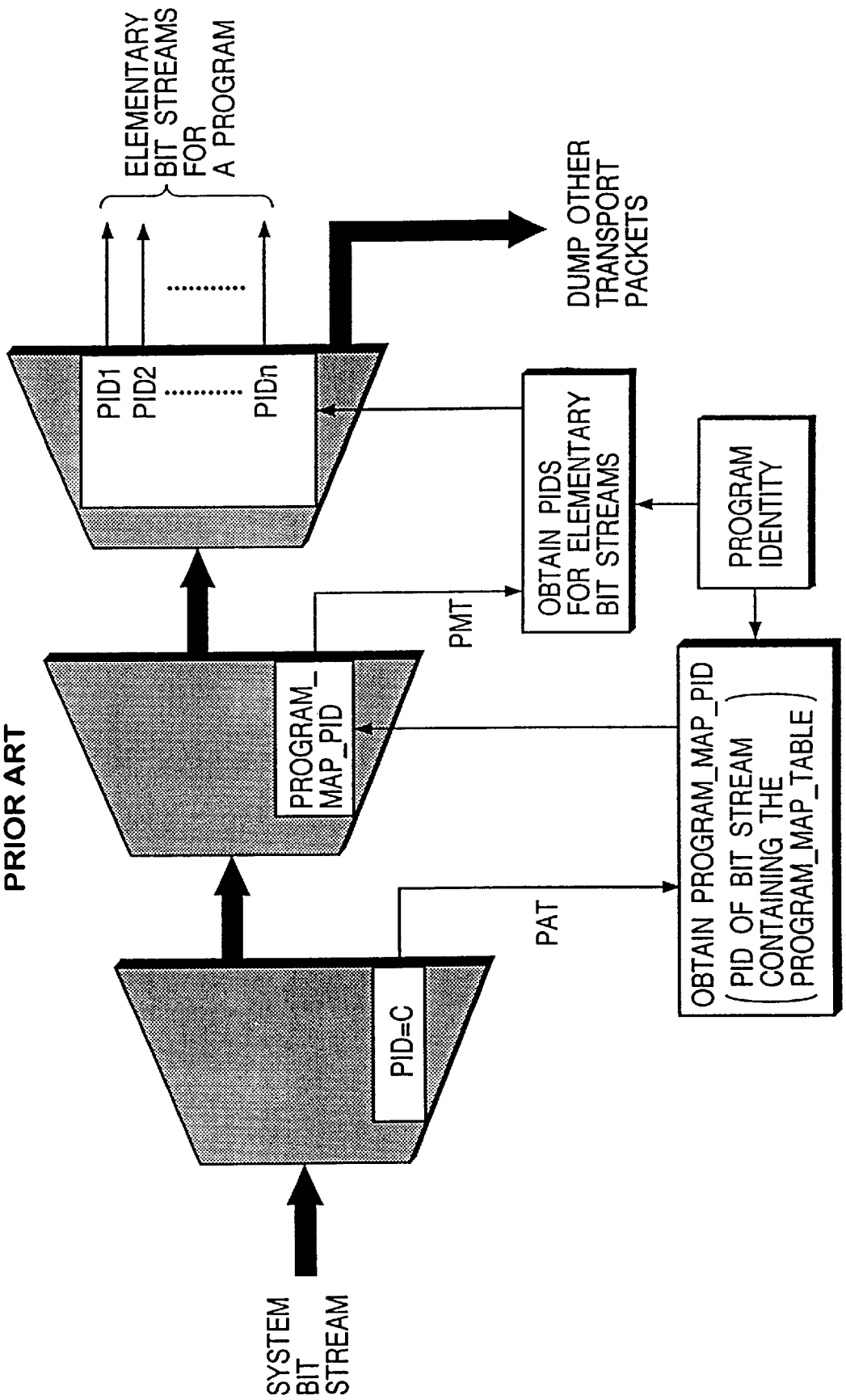
FIG. 3 is a diagram illustrating the operation of processing bit stream data.

FIG. 3 illustrates the procedure of processing the transport stream as a bit stream. Transport header information of the bit stream includes a program ID (hereinafter abbreviated as PID). This PID contains data for forming a program association table (hereinafter abbreviated as PAT). Since the program number is contained in this PAT, the program number detection circuit 64 first detects the PID of the transport header, and collects data from the PID of the bit stream whose payload is of a PAT data type to thereby form the PAT. The PAT is then divided into program association segments each containing a program list. The first 16 bits in the program list indicate a program number.

Figure 4:
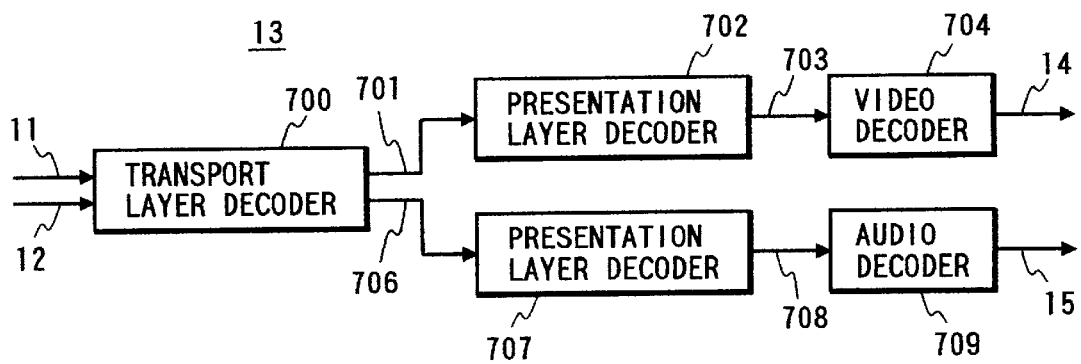
FIG. 4 is a block diagram showing the structure of a decoder unit shown in FIG. 1.

FIG. 4 is a block diagram showing the details of the decoder unit 13 shown in FIG. 1. The decoder unit 13 outputs a video signal 14 and an audio signal 15 in accordance with a selected program number. A transport layer decoder 700 first extracts the PAT from the PID of the transport stream 11, and detects an ID of a program map table (hereinafter abbreviated as PMT). The PMT is recorded with an ID of an elementary bit stream. In accordance with IDs, the elementary bit streams of the selected program are extracted. Each elementary bit stream is also being packeted, and video data 701 thereof is sent to a video presentation (PES) layer decoder 702 and audio data 706 thereof is sent to an audio PES layer decoder 707.

FIG. 5 shows the format of the video data 701. As shown, the video data has a hierarchical structure finely divided into a PES layer, a sequence layer, a picture layer, a slice layer, a macro block layer, and a block layer. The PES layer decoder 702 decodes each layer in the order recited.

Next, the video decoder 704 decodes an output 703 of the PES layer decoder 702 in accordance with the Video Rules of Grand Alliance HDTV System Specification. The audio decoder 709 decodes an output 708 of the PES layer decoder 702 in accordance with Audio Rules of Grand Alliance HDTV System Specification. In this manner, the video signal 14 and audio signal 15 can be obtained. The details of the packet structure are given in the MPEG2 System (ISO/IEC13818-1) or in the Grand Alliance HDTV System Specification of ATV.

Figure 6:
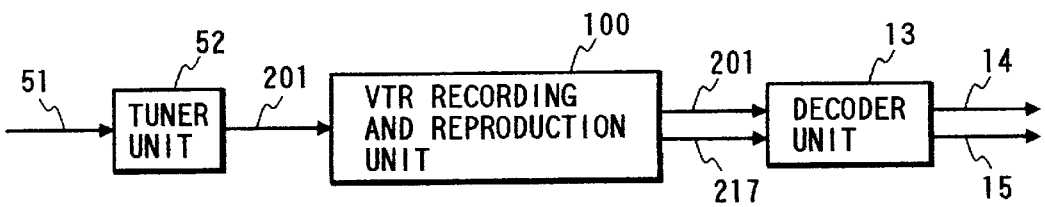
FIG. 6 is a block diagram showing the structure of an apparatus for reproducing an ATV broadcast signal by using a digital VTR according to an embodiment of the invention.

FIG. 6 is a block diagram showing the structure of the data reproducing apparatus for recording/reproducing such an ATV broadcast signal 51 by using a digital VTR 100 according to a first embodiment of the invention. VTR 100 is connected between the tuner unit 52 and decoder unit 13. As will be later detailed, VTR 100 has a program number detection circuit. During reproduction, a reproduction unit of VTR 100 outputs a transport stream 201 and a control signal 217 containing information regarding attributes of data such as a program number, to the decoder unit 13.

Figure 7:
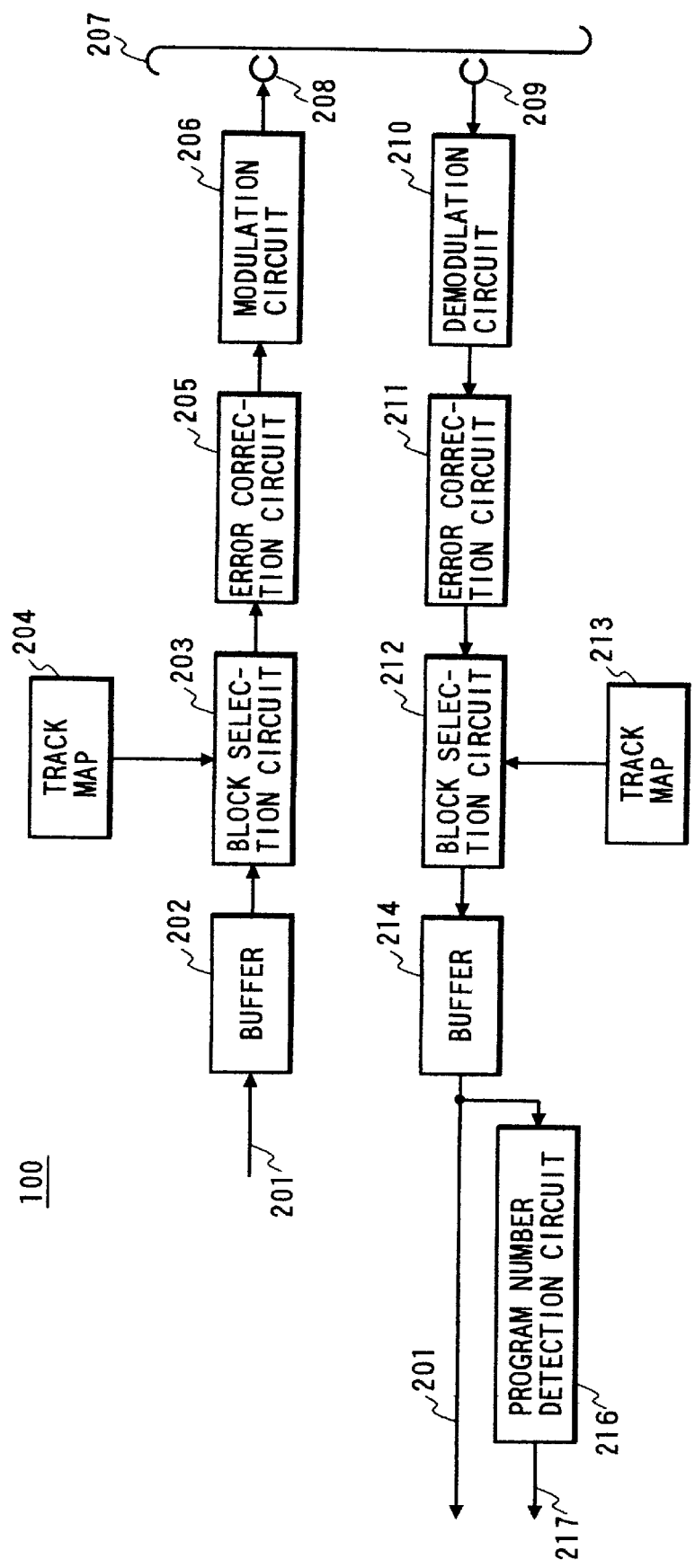
FIG. 7 is a block diagram showing the structure of the digital VTR of the embodiment.

FIG. 7 shows an example of the structure of VTR 100. A bit stream 201 supplied from the tuner unit 52 is buffered by a buffer 202 and thereafter, rearranged by a block selection circuit 203 in the unit of each sync block in accordance with information supplied from a track map 204. The bit stream is then added with an error correction code by an error correction circuit 207, modulated by a modulation circuit 206, and digitally recorded on a magnetic tape 207 by a magnetic head 208.

For data reproduction, a data signal is read by a reproduction head 209 and demodulated by a demodulation circuit 210. Then errors generated by a tape/head system are corrected by an error correction circuit 211. Next, the error-corrected data is rearranged by a block selection circuit 212 in the form of transport stream in accordance with information supplied from a track map 213. The rearranged transport stream is buffered by a buffer circuit 214 to recover the original transport stream 201 which is supplied to the decoder unit 13.

An output of the buffer 214 is applied to two signal paths, the reproduced transport stream 201 being outputted directly to the decoder unit 13 via one of the two signal paths, and inputted to a program number detection circuit 216 via the other signal path.

Figure 8:
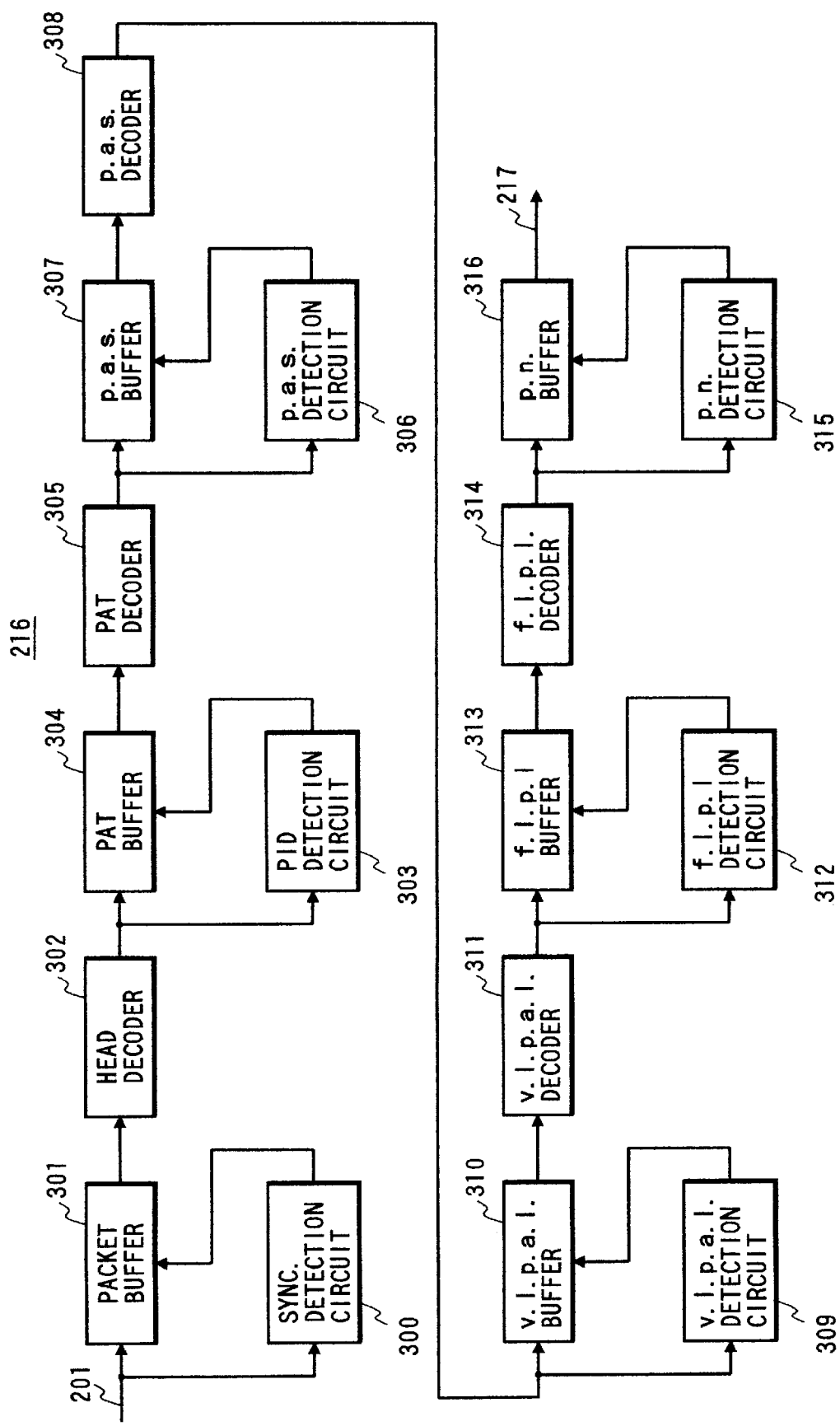
FIG. 8 is a block diagram showing the structure of a program number detection circuit shown in FIG. 7.

FIG. 8 is a block diagram showing the details of the program number detection circuit 216. The transport stream 201 is buffered by a packet buffer 301 in response to a sync detection of a sync detection circuit 300. Thereafter, a header decoder 302 decodes header information which is then sent to a PAT buffer 304. The header information contains the PID which is detected by a PID detection circuit 303 so that the PAT can be detected from the PAT buffer 304. This PAT is decoded by a PAT decoder 305, and a program association segment (hereinafter abbreviated as p.a.s.) can be detected by using a p.a.s. detection circuit 306 and a p.a.s. buffer 307.

A variable program association list (hereinafter abbreviated as v.l.p.a.s.) is contained in the p.a.s. and can be detected by using a v.l.p.a.s. buffer 310 and a v.l.p.a.s. detection circuit 309. This v.l.p.a.s. is decoded by a v.l.p.a.l. decoder 311, and a fixed length program list (hereinafter abbreviated as f.l.p.l.) can be detected by using an f.l.p.l. buffer 313, an f.l.p.l. detection circuit 312, and an f.l.p.l. decoder 314. This f.l.p.l. is four-byte fixed length data, and the first 16 bits indicate a program number (p.n.). The program number outputted by using a p.n. detection circuit 315 and a p.n. buffer 316 is then supplied as a control signal 217 to the decoder unit 13.

Figure 9:
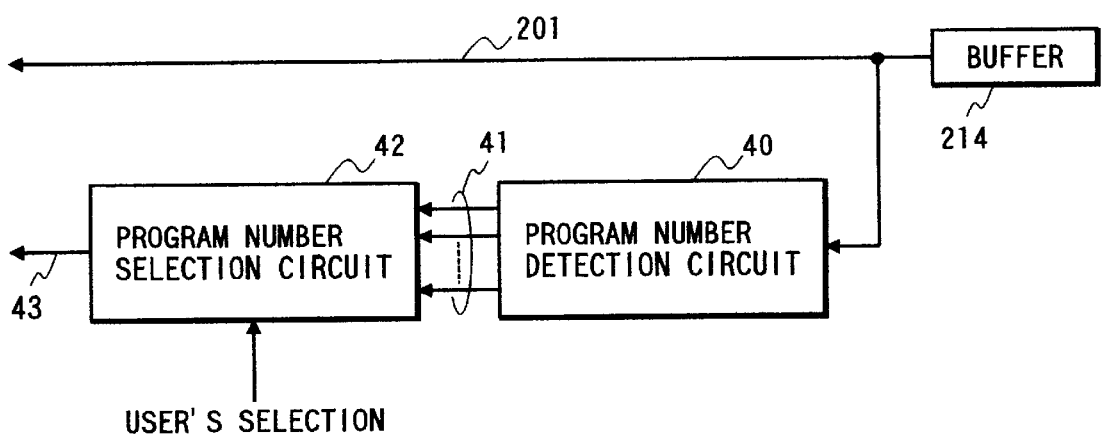
FIG. 9 is a block diagram showing the circuitry at the stages after buffer of a digital VTR according to another embodiment of the invention.

FIG. 9 is a block diagram illustrating a second embodiment of the invention. The structure and operation of the buffer 214 are similar to the first embodiment, and so the description thereof is omitted. In the embodiment shown in FIG. 9, assuming that there are a plurality of program numbers 41 decoded by a program number detection circuit 40, a program number selection circuit 42 is connected to the program number detection circuit 40. Several selection methods to be performed by the program number selection circuit 42 are conceivable. For example, if a user selects a program number, this number is preferentially selected. In other cases, for example, a priority order of program numbers is determined in accordance with the ascending order of program numbers decided by an encoder, in accordance with a past selection history (preferential to a larger occurrence frequency in the past), in accordance with the detection order of program numbers, or in accordance with the program number last selected in the previous operation.

In this embodiment, although such a selection function is performed by the program number selection circuit 42, it may be assigned to the decoder 13.

A method of physically interconnecting VTR 100 and the decoder unit 13 is not limitative. For example, the bit stream and control signal may be connected by separate and independent cables, or may be connected by using a digital interface such as IEEEP1394.

The invention is not limited to only VTR, but it is obvious that the invention is also applicable to other data reproducing apparatuses such as a CD-ROM player.

As described so far, in the first embodiment described above, information regarding attribute data is detected from a multiplexed bit stream, and the detected information regarding the attribute data is outputted together with the bit stream. Accordingly, the reproduced bit stream can be decoded correctly and a good reproduced signal can be always obtained even during the transition period between program numbers by using the control information regarding the attribute data supplied by the data reproducing apparatus.

In the second embodiment, one of a plurality set information regarding the attribute of data is selected and outputted. Accordingly, even if the reproduced signal contains a plurality of program numbers, a good reproduced signal can be always obtained through a user selection or a priority order of program numbers.

What is claimed is:

1. A data reproducing apparatus, comprising:
   (a) reproducing means for reproducing bit stream data in which coded data of a plurality of programs are multiplexed, from a recording medium on which the bit stream data is recorded, the bit stream data also including attribute data for discriminating each of the plurality of programs included in the bit stream data;
   (b) detecting means for detecting the attribute data from the bit stream data reproduced by said reproducing means; and
   (c) output means for parallel outputting the attribute data detected by said detection means and the bit stream data reproduced by said reproducing means.

2. A data reproducing apparatus according to claim 1, wherein said bit stream data comprises a packeted data group.

3. A data reproducing apparatus according to claim 2, wherein said data group comprising video data, audio data, and text data.

4. A data reproducing apparatus according to claim 3, wherein said video data is encoded by a scheme stipulated by MPEG2 Video (ISO/IEC13818-2).

5. A data reproducing apparatus according to claim 3, wherein said audio data is encoded by a scheme stipulated by MPEG2 Audio (ISO/IEC13818-3).

6. A data reproducing apparatus according to claim 3, wherein said audio data is encoded by a scheme stipulated by ATV.

7. A data reproducing apparatus according to claim 1, wherein the attribute data is a program number in conformity with a scheme stipulated by MPEG2 System (ISO/IEC13818-1).

8. A data reproducing apparatus according to claim 1, wherein the bit stream data is in conformity with a scheme stipulated by MPEG2 System (ISO/IEC13818-1).

9. A data reproducing apparatus according to claim 1, wherein the bit stream data is in conformity with a scheme stipulated by ATV.

10. A data reproducing apparatus according to claim 1, wherein said detection means has selective output means for selecting and outputting one of a plurality set of attribute data.

11. A data reproducing apparatus according to claim 10, wherein said selective output means allows a user to select one of a plurality set of attribute data, and the selected one is outputted with a priority over other attribute data.

12. A data reproducing apparatus according to claim 11, wherein if the user does not select one of a plurality of sets of attribute data, selection means provided in said selective output means selects one of a plurality set of attribute data in accordance with a priority order.

13. A data reproducing apparatus according to claim 12, wherein if the user does not select one of a plurality set of attribute data, selection means provided in said selective output means selects one of a plurality set of attribute data in accordance with a priority order determined from the value of each signal representative of the attribute data.

14. A data reproducing apparatus according to claim 11, wherein if the user does not select one of a plurality set of information regarding the attribute of data, selection means provided in said selective output means selects one of a plurality set of attribute data in accordance with a priority order determined from a history of the attribute data selected in the past.

15. A data reproducing apparatus according to claim 11, wherein if the user does not select one of a plurality set of attribute data, selection means provided in said selective output means selects one of a plurality set of attribute data in accordance with a priority order determined from an order of detecting attribute data.

16. A data apparatus according to claim 1, wherein the recording medium comprises a magnetic tape recording medium.

17. A data reproducing apparatus according to claim 1, wherein the recording medium comprises a CD-ROM recording medium.

18. A data reproducing method comprising the steps of:
   reproducing bit stream data in which coded data of a plurality of programs are multiplexed, from a recording medium on which said bit stream data is recorded;
   reproducing means for reproducing bit stream data in which coded data of a plurality of programs are multiplexed, from a recording medium on which the bit stream data is recorded, the bit stream data also including attribute data for discriminating each of the plurality of programs included in the bit stream data;
   detecting the attribute data from the bit stream data reproduced in said reproducing step; and
   parallel outputting the attribute data detected in the detecting step in the bit stream data reproduced in the reproducing step.

\* \* \* \* \*

UNITED STATES PATENT AND TRADEMARK OFFICE
CERTIFICATE OF CORRECTION

PATENT NO. : 6,477,317 B1 Page 1 of 1
DATED : November 5, 2002
INVENTOR(S) : Osamu Itokawa It is certified that error appears in the above-identified patent and that said Letters Patent is hereby corrected as shown below:

Column 1,
Line 18, "under" should read -- in --.

Column 6,
Line 19, "of" should be deleted.

Signed and Sealed this

Third Day of February, 2004

JON W. DUDAS
*Acting Director of the United States Patent and Trademark Office*